Dec. 16, 1924.
J. W. BROWN, JR
1,519,952
WORK POSITIONING DEVICE FOR DRILLING MACHINES
Filed Oct. 6, 1921
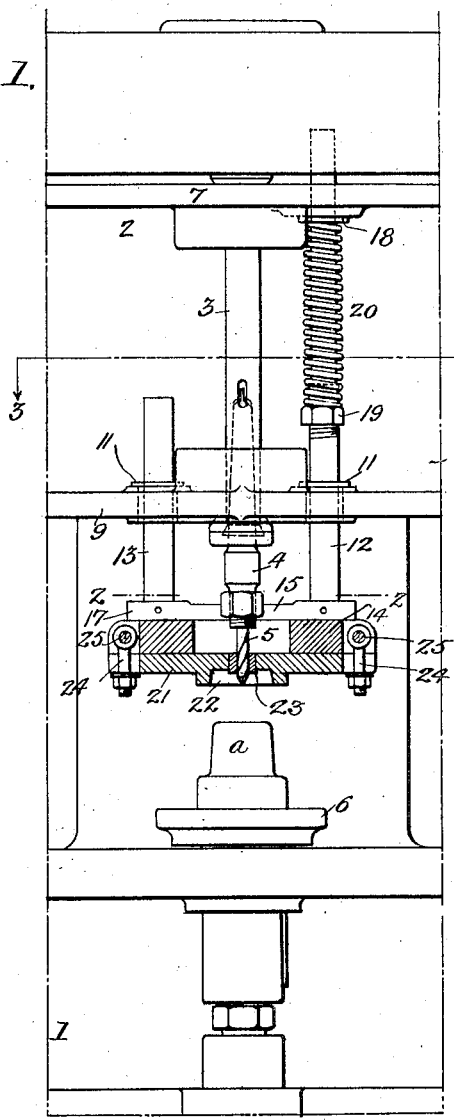
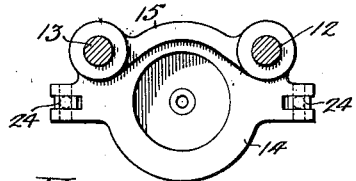
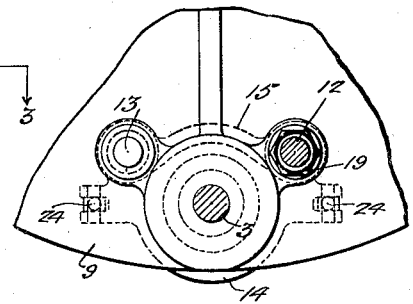
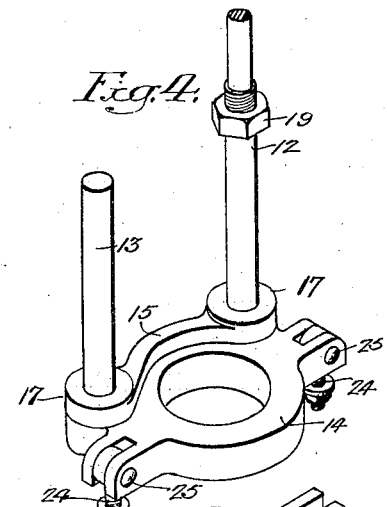
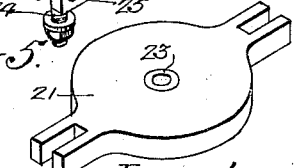
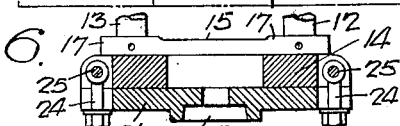
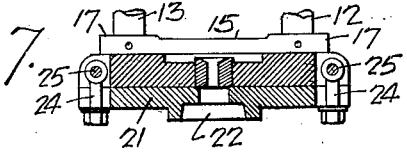
Inventor
John Wilson Brown Jr.
by his Attorneys Patented Dec. 16, 1924.

1,519,952

UNITED STATES PATENT OFFICE.

JOHN WILSON BROWN, JR., OF PHILADELPHIA, PENNSYLVANIA.

WORK-POSITIONING DEVICE FOR DRILLING MACHINES.

Application filed October 6, 1921. Serial No. 505,794.

*To all whom it may concern:*

Be it known that I, JOHN WILSON BROWN, Jr., a citizen of the United States, residing in Philadelphia, Pennsylvania, have invented Improvements in Work-Positioning Devices for Drilling Machines, of which the following is a specification.

The object of my invention is to provide a work positioning device to be used in connection with a drilling machine so that it will automatically center the work and hold it in a central position and at the same time center the drill.

This object I attain in the following manner, reference being had to the accompanying drawings, in which:

Fig. 1 is a side view of sufficient of a drilling machine to show my work positioning device mounted in position to guide the drill and to center the work mounted on the table of the machine;

Fig. 2 is a sectional plan view on the line 2—2, Fig. 1;

Fig. 3 is a sectional plan view on the line 3—3, Fig. 1;

Fig. 4 is a detached perspective view of a part of the device;

Fig. 5 is a detached perspective view of the centering plate of the device; and

Figs. 6 and 7 are views illustrating modifications of the invention.

Referring to the drawings, 1 is a section of a drilling machine having a head 2 in which is located a power driven spindle 3. Mounted in the spindle is the chuck 4 for the drill 5. 6 is the table of the drilling machine, which is raised and lowered by any suitable mechanism so as to bring the work up to the drill, as the drill spindle has no vertical movement in the present instance. The machine is a rotary machine having a number of spindles and the tables are raised and lowered by a cam rail. Such a machine is shown in an application for patent filed by me on the tenth day of July, 1920, Ser. No. 395,343.

On the head 2 is an upper flange 7 in which the upper bearings for the spindles are located and a lower flange 9 in which the lower bearings for the spindles are located. In this lower flange are two openings in which are bushings 11 and through which pass rods 12 and 13, respectively, which carry the body portion 14 of the work postioning device. This body portion has a brace 15 extending back of the drill opening 16 and connecting the two bearings 17 in which the rods 12 and 13 are secured. The rod 12 is considerably longer than the rod 13 and extends through an opening 18 in the upper flange 7 of the head 2. Between this flange and a nut 19, adjustably mounted on the rod, is a spring 20, which tends to force the rod and its positioning device down towards the table 6. Carried by the body portion 14 of the device is a plate 21 in which is a recess 22 having beveled sides. This recess is shaped to accommodate the upper end of the work which is carried by the table and which is to be drilled. In this plate is a removable guide block 23 having an opening of a size equal to the size of the drill to be used. This guide block can be removed and others of different sizes can be substituted for it. The plate 21 is held to the body portion by bolts 24 pivoted at 25 to the body portion and adapted to slots in the plate. On these bolts are nuts for firmly securing the plate to the body portion. Other means of fastening may be employed without departing from the spirit of the invention.

This invention is especially adapted for use in drilling machines where a large number of similar parts are to be drilled, consequently, a number of special centering plates can be made to fit the work *a*. These plates are secured to the body portion of the work positioning device so that when the work *a* is placed on the table and the table raised, the work will be centered in respect to the drill and the drill will be guided in the block so that the work will be accurately drilled. As the table carries the work to the drill, the work will first come in contact with the device, which will center the work and the device will yield and will be carried by the work to allow the drill to enter the work to the depth desired. As the table recedes, the spring 20 forces the positioning device down, withdrawing the work from the drill should it have a tendency to adhere.

Fig. 6, the positioning device is shown as recessed to center the work in respect to the drill, the drill steadying means being omitted.

In Fig. 7, one part of the positioning device is shown carrying a guide or a steadying means for the drill and the other part arranged to center the work.

I claim:

1. In a drilling machine, the combination with a head, of a spindle adapted to receive a drill mounted on said head; a work positioning device comprising a body portion; spaced parallel guide rods, said head and body portion having a relative sliding guide engagement with said rods; means for resiliently forcing said work positioning device away from said head; and a centering plate secured on said body portion, said plate having a perforation to receive said drill.

2. The combination in a drilling machine, of a head; a drill spindle mounted thereon; a table for the work; a work positioning device mounted on the head and having a body portion through which the drill, which is mounted on the spindle, entends; two rods projecting from the body portion of the device on each side of the drill spindle and extending through openings in the head; a spring tending to force the work positioning device away from the drill and towards the work; and a centering plate detachably secured to the body portion, said centering plate having a recess for the work and a guide for the drill.

3. The combination in a drilling machine, of a head having upper and lower flanges; a drill spindle mounted in the flanges of the head; a table for the work located under the lower flange; a work positioning device having a body portion; two guide rods projecting upwardly from the body portion of the work positioning device and extending through openings in the lower flange of the head, one of said rods being longer than the other and extending through the upper flange of the head; a nut on the rod; a spring between the nut and the upper flange, said spring tending to force the positioning device towards the work; a detachable centering plate carried by the positioning device and having means for centering the work; and means for guiding the drill.

4. In a drilling machine, the combination with a head having spaced bearings; of a spindle adapted to receive a drill mounted on said head; a work positioning device comprising a body portion and upwardly extending rods, said rods being slidably mounted in said spaced bearings; means for resiliently forcing said work positioning device away from said head; and a centering plate secured on said body portion, said plate having a perforation adapted to receive said drill.

5. In a drilling machine, a work positioning device comprising a body portion; guide rods projecting upwardly therefrom, one of said rods being longer than the other; resilient means coacting with one of said guide rods for forcing said work positioning device in a predetermined direction; and a centering plate detachably mounted on said body portion.

6. In a drilling machine, a work positioning device comprising a body portion; guide rods projecting upwardly therefrom, one of said rods being longer than the other; resilient means coacting with said longer rod for forcing said positioning device in a predetermined direction; and a centering plate mounted on said body portion.

7. In a drilling machine, the combination with a head having upper and lower flanges; of a drill spindle mounted in the flanges of said head; a work positioning device having a body portion; guide rods projecting upwardly from said body portion and extending through openings formed in the lower flange of said head, one of said rods being longer than the other and extending through an opening in said upper flange; resilient means for forcing said positioning device away from said head; and a centering plate carried by said positioning device.

JOHN WILSON BROWN, Jr.